Nov. 10, 1942.　　　A. T. ROCHTE　　　2,301,328
OPHTHALMIC MOUNTING
Filed Dec. 11, 1941
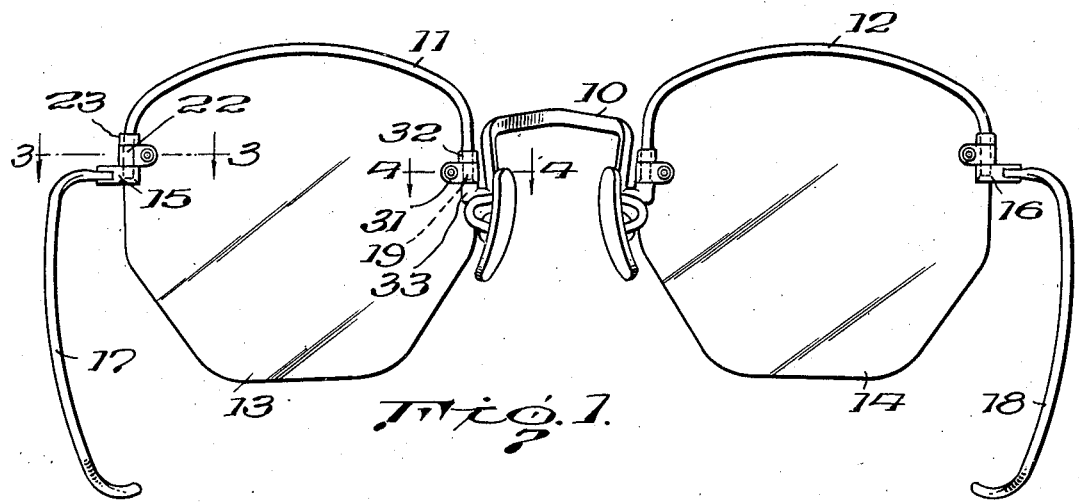

Patented Nov. 10, 1942

2,301,328

UNITED STATES PATENT OFFICE 2,301,328

OPHTHALMIC MOUNTING

Augustine T. Rochte, Tiffin, Ohio

Application December 11, 1941, Serial No. 422,574

5 Claims. (Cl. 88—41)

The present invention relates in general to ophthalmic mountings and in particular to mountings of the rimless type having a brace arm extending around a portion of the lens from the bridge piece to the temple piece.

An important object of the invention is the provision of a mounting of this general type in which the tendency of breakage both in the mounting of the lens and in subsequent use is reduced to a minimum by the provision of a novel form of lens-strap whereby the lens is held firmly in the mounting with substantially no strain and whereby relatively heavy bridge and temple pieces may be used without added danger of breakage of the lens during the necessary slight bending of the frame required for final adjustments of the mounted lenses to the wearer.

A further object of the invention is to provide a mounting of the above type which, while protecting and holding the lens firmly in position, will permit of considerable distortion or change in form of the mounting without substantial strain on the lenses.

Another object is the provision of a frame which will permit the lens to be quickly and accurately mounted by permitting slight adjustment of the frame to conform to the shape of the lens and the spacing of the mounting holes.

Various other objects and advantages of the invention will be apparent upon reference to the following specification and the drawing accompanying the same.

In the drawing

Figure 1 is a rear elevation of my improved mounting including the lenses;

Figure 2 is a top plan view of Figure 1;

Figure 3 is an enlarged fragmentary section taken on the line 3—3 of Figure 1;

Figure 4 is an enlarged fragmentary section taken on the line 4—4 of Figure 1;

Figure 5 is a section on the line 5—5 of Figure 3; and

Figure 6 is an enlarged detail, perspective view of the hinged lens-strap.

Referring to the drawing more in detail, the mounting consists in general of a bridge piece 10 and a pair of brace arms 11 and 12 extending around the lenses 13 and 14 to the temple pieces 15 and 16, respectively, to which are hingedly connected the temple shafts 17 and 18.

Inasmuch as the mounting is symmetrical with the right and left portions identical except that one is a mirrored image of the other, a description of one, for example, the portion mounting the left lens will suffice. Here it will be noted that the brace arm 11 approaches its points of connection with the bridge and temple pieces through short straight portions 19 and 20, respectively. These portions are of circular cross-section and at their extreme ends are rigidly secured to such bridge piece and temple piece in any suitable manner as, for example, by means of a reduced end portion extended through an opening in the bridge or temple piece and swaged or headed to secure the joint as indicated at 21 in Figure 5.

For securing the lens in the mounting, I provide a hinged lens-strap such as the lens-strap 22 at the temple piece 15, hingedly mounted on the straight cylindrical end portion 20 of the brace arm 11 and held against axial movement relative to the brace arm by a stop ring 23 at the top, and at the bottom by abutment against the temple piece 15, the stop ring being secured to the brace arm in any suitable manner as by welding or soldering. Where the lens-strap 22 bears against the lens 13 it is given the general contour of the lens and is provided with openings through the overlapping portion of the strap, the innermost opening 24 being threaded to receive the threaded end 25 of the mounting bolt 26 while the outer opening 27 is formed with a relatively larger diameter to receive the bolt with convenient clearance. The bolt 26 is passed through the lens mounting hole 28 from the outer side of the lens through a washer 29 and threaded into the tapped opening 24 in the lens strap to firmly secure the lens to the strap, the bolted joint thus established being secured by means of the lock nut 30 threaded onto the inner end of the bolt 26.

The other lens-strap 31 similarly hingedly mounted on the straight cylindrical portion 19 of the brace arm 11, secures the other end of the lens at the bridge piece. Here the hinged lens-strap is held against axial movement on the brace arm 11 at the top by a stop ring 32 and at the bottom by the adjacent portion 33 of the bridge piece 10. The mounting bolts 26 are fitted into their respective lens openings with sufficient looseness to prevent undue strain in the glass and to permit pivotal movement of the lens-strap about the axis of the bolt also without strain on the glass.

From the above it will be clear that in mounting the lenses, the hinged connection of the lens-straps permits the straps to be readily brought into the plane of the lens surface and to be secured to the lens by means of the mounting bolts with substantially no strain on the lens inasmuch as the face of the lens-strap adjacent the lens is given the curvature of the curved plane of the lens while the hinged connection of the lens-straps permits them to adjust themselves evenly against the surface of the lens as the bolts are drawn into the lens-straps. With this arrangement of the lens-strap hingedly secured to the mounting on a substantially vertical axis and pivotally secured to the lens on a substantially horizontal axis, it is found that not only can the lens be drawn into mounted position by the bolts without the setting up of dangerous stresses in the glass but that after the lenses are mounted the necessary bending and slight re-shaping of the frame to fit it to the user may be made, even with a relatively heavy frame, without undue strain on the lenses. This advantage is believed to result from the slight in and out relative movement of the lens afforded by the hinged connection of the lens-straps and a slight up and down movement afforded by the pivotal connection of the lens-strap to the lens together with the natural slight flexibility of the lens-straps.

While I have herein shown and described a preferred embodiment of my invention for the sake of disclosure, it is to be understood that the invention is not limited to the specific form shown, but contemplates all such modifications and variations as fall fairly within the scope of the appended claims.

What is claimed is:

1. An ophthalmic mounting comprising a bridge piece and a temple piece, a brace arm extending around a portion of the lens from the bridge piece to the temple piece, said brace arm having a straight portion of circular, cross-section near each of its points of juncture with the bridge and temple pieces, and a pair of lens-straps each journaled about one of said straight portions of the brace arm.

2. An ophthalmic mounting comprising a bridge piece and a temple piece, a brace arm extending around a portion of the lens from the bridge piece to the temple piece, said brace arm having a straight portion of circular, cross-section near each of its points of juncture with the bridge and temple pieces, and a pair of lens-straps each journaled about one of said straight portions of the brace arm, together with means for preventing movement of the lens-straps axially of said straight portions.

3. An ophthalmic mounting comprising a bridge piece and a temple piece, a brace arm extending around a portion of the lens from the bridge piece to the temple piece, said brace arm having a straight cylindrical portion near each of its points of juncture with the bridge and temple pieces, and a pair of lens-strap elements each looped upon itself about one of said straight cylindrical portions with the ends of the loop lapped one upon the other and arranged to bear one against the lens, the loop end nearest the lens being provided with an unthreaded opening adapted to loosely receive a mounting bolt and the loop end farthest from the lens being threaded for threaded engagement with the bolt.

4. An ophthalmic mounting comprising a lens supporting frame-element having a straight portion of circular cross-section, a lens strap element looped upon itself about and in pivotal relation with said straight cylindrical portion with the ends of the loop lapped one upon the other and arranged to bear one against the lens, the loop end nearest the lens being provided with an opening adapted to loosely receive a mounting bolt, the loop end farthest from the lens being threaded for threaded engagement with the bolt, and means on said straight portion at opposite sides of the strap preventing movement of the lens strap axially of the said straight portion in opposite directions.

5. In an ophthalmic mounting a frame including a bridge piece, a temple piece and a brace arm connecting the bridge piece with the temple piece, said frame having a short straight cylindrical portion extending in a generally vertical direction, a lens strap journalled about said straight portion, means pivotally connecting the strap to the lens on a generally horizontal axis extending transversely of the lens and about which the lens journals, and means on opposite sides of the strap in fixed relation to said straight portion preventing movement of the lens strap axially of said straight portion of the mounting in either direction.

AUGUSTINE T. ROCHTE.